May 12, 1936.  W. W. EITEL  2,040,602

GLASS WORKING APPARATUS

Filed April 17, 1934

INVENTOR,
WILLIAM W. EITEL.
BY Lippincott & Metcalf
ATTORNEYS

Patented May 12, 1936

2,040,602

UNITED STATES PATENT OFFICE 2,040,602

GLASS WORKING APPARATUS

William W. Eitel, San Bruno, Calif., assignor to Heintz & Kaufman, Ltd., San Francisco, Calif., a corporation of Nevada Application April 17, 1934, Serial No. 720,939

1 Claim. (Cl. 49—2)

My invention relates to glass working apparatus, and particularly to such apparatus for positioning and mounting elements within glass envelopes.

Among the objects of my invention are: to provide apparatus which permits the accurate placement of elements within glass envelopes; to provide apparatus wherein the elements may be adjustably positioned prior to securing them to the envelope; to provide apparatus which effects simultaneous connection, with an envelope, of a plurality of mounting means for positioning an element within the envelope; to provide apparatus which facilitates production of glass articles having elements mounted therein; and to provide apparatus which insures, in the manufacture of articles of the class described, uniformity of the finished product.

Other objects of my invention will be apparent or will be specifically pointed out in the description forming a part of this specification, but I do not limit myself to the embodiment of the invention herein described, as various forms may be adopted within the scope of the claim.

Referring to the drawing.

Figure 1:
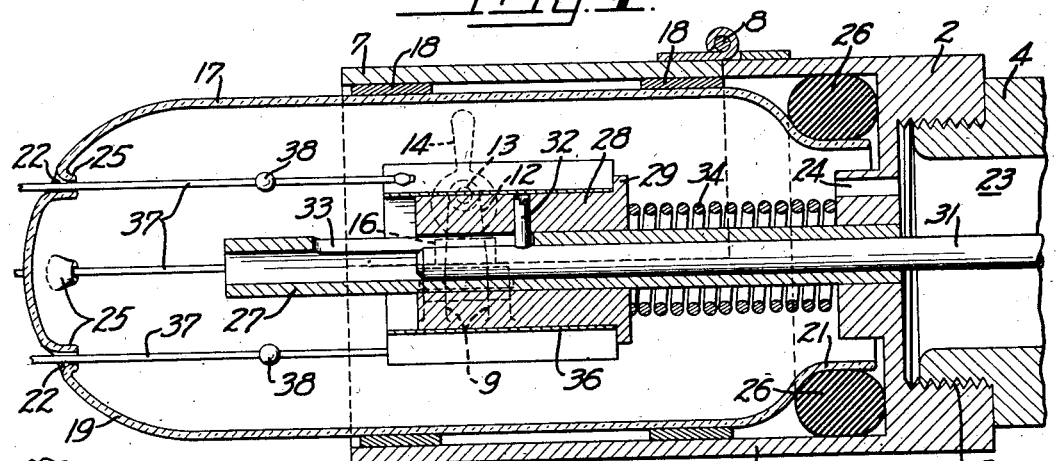
Figure 1 is a sectional elevation, of glass working apparatus embodying my invention, showing the relationship between the envelope and the element to be mounted therein at the start of the operation.
Figure 2:
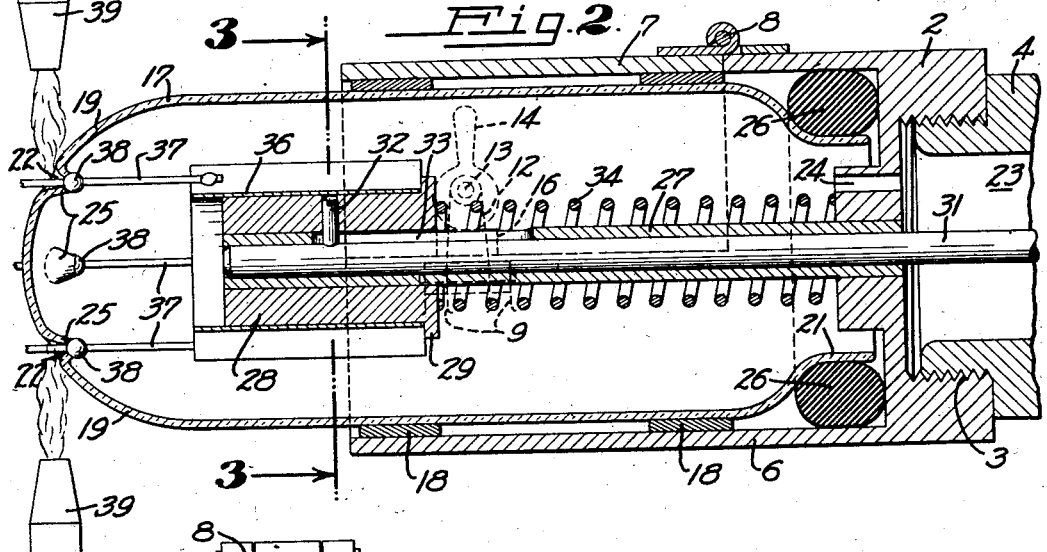
Figure 2 is a sectional elevation, of the apparatus, showing the relationship of the parts prior to the connection of the element and the envelope.
Figure 3:
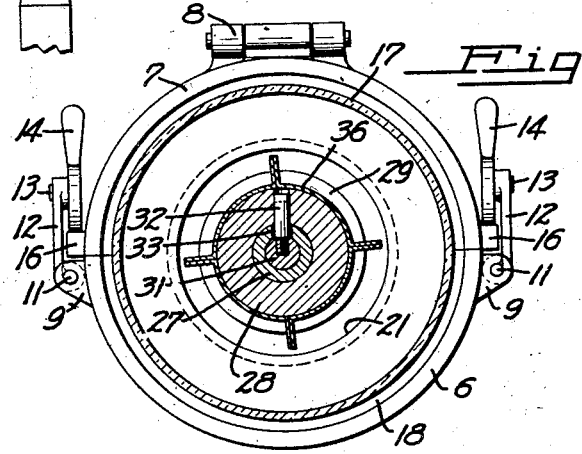
Figure 3 is a cross sectional view of the chuck. The plane in which the view is taken is indicated by the line 3—3 of Figure 2.

In terms of broad inclusion, the glass working apparatus of my invention includes a chuck adapted to be rotated by any suitable means and comprising a pair of relatively movable hinged sections which are adapted to engage a glass article. A latch is provided for securing the sections together to prevent relative movement therebetween when the chuck is in operation.

A guide is provided, mounted on the chuck for rotation therewith, and a mandrel is slidably mounted on the guide. This mandrel is adapted to support and locate an element to be mounted within the glass article and the slidable feature of the mandrel is for the purpose of adjustably positioning the element before its connection with the article.

The element is preferably provided with a plurality of connecting means, and the glass article with a plurality of spaced apertures corresponding with the connecting means. Means are provided for simultaneously heating, while the chuck is rotating, the glass about the apertures so that simultaneous joining of the connecting means and the article will be effected. Manually operable means are provided for imparting oscillatory motion to the mandrel to create a satisfactory weld by insuring that proper fusion occurs between the connecting means and the article.

In greater detail, the preferred apparatus of my invention comprises a chuck having a body portion 2 provided with threads 3 whereby it may be connected to a spindle 4, or any other suitable rotatable member. The chuck comprises a semi-circular section 6, which is formed integrally with the body portion 2, and a movable semi-circular section 7 which is connected to the section 6 by means of a hinge 8. A pair of latches are provided for securing the sections together, each comprising a pair of lugs 9, formed on the section 6, and provided with a hinge pin 11 which carries an arm 12. The upper end of the arm is provided with a pin 13 on which the latch 14 is journaled. The body of the latch is disk shaped and the journal for the pin 13 is offset from the center thereof so as to provide an eccentric which, when rotated so that its longest radius rides upon a block 16 formed on the section 7, will securely lock the two sections together. The section 7 may be released by rotating the latch to a low point on the eccentric, whereupon the arm 12 may be swung outwardly, permitting the section 7 to be raised.

The chuck is adapted to engage a glass article, which is illustrated, as an example, as the envelope 17 of a space discharge device. It will be understood that I do not wish to limit myself to the particular shape of article shown in the drawing, as it is obvious that the chuck may be modified to engage articles of any shape without departing from the spirit of the invention. In order to provide a cushion between the envelope and the chuck and, at the same time, to increase the frictional engagement between the parts, friction strips 18, of rubber or cotton webbing, are attached, by means of rivets or other suitable means, in semi-circular segments, to each section of the chuck. The envelope shown is provided with a domed end 19 and a contracted neck portion 21, the former being provided with a plurality of spaced apertures 22.

These apertures are preferably formed, while the envelope is in position in the unrotated chuck, by directing a plurality of spaced pointed flames, not shown, against the end 19 of the envelope, to heat the glass at positions corresponding to the desired locations of the apertures. When the glass is heated sufficiently the pressure within the envelope is reduced below atmospheric pressure, by connecting the suction of a pump, also not shown, to the passage 23 of the spindle 4, which passage communicates with the envelope through the passage 24 formed in the chuck body. This reduction of pressure causes the heated glass to be drawn inwardly in a plurality of protuberances 25, the heads of which burst, forming the apertures 22, when the thickness of the glass is reduced to a point unable to further withstand the pressure outside of the envelope. To prevent leakage, a gasket 26 is provided between the chuck and the neck portion 21 of the envelope. After formation of the apertures 22 the envelope may be temporarily removed from the chuck.

Means are provided for supporting and positioning an element to be mounted within the envelope. A tubular guide 27 is fixed in the chuck body 2 and extends outwardly therefrom in axial alinement with the axis of rotation of the chuck. A mandrel 28, provided with a flange 29, is slidably disposed on the guide, and is connected with a rod 31, slidably mounted in the guide, by means of a pin 32 which passes through a slot 33 formed in the wall of the guide. A spring 34 is interposed between the mandrel 28 and the chuck body 2 for normally urging the mandrel to the full outward extent of its travel. The mandrel is adapted to support an element, which may be a tubular anode electrode 36, for example, to be mounted within the envelope, the frictional engagement between the two parts being such that they are not readily movable with respect to each other. The electrode is provided with a plurality of rods 37, preferably tungsten, which correspond in number and in spacing with the apertures 22, and each rod is provided with a glass bead 38 thoroughly sealed to the rods.

After mounting the electrode on the mandrel, the mandrel is retracted, as shown in Figure 1, and the envelope is remounted in the chuck so that the rods 37 pass through the apertures 22. The chuck is now rotated and the mandrel is extended, by means of suitable manually operable means connected with the rod 31, to bring the beads 38 into light contact with the protuberances 25. Welding flames from a plurality of burners 39 are now directed against the end 19 of the envelope, to heat and soften the glass in an annular area thereof including the apertures 22. When the envelope and the beads soften they will adhere, but it is necessary to coalesce the contacting glass bodies before a satisfactory weld may be obtained. This is accomplished by manipulating the rod 31 to produce a reciprocatory motion in the mandrel which works or kneads the glass at the seals and permits the proper uniting thereof. When the welding operation is completed the pin 32 will be located at the outer limit of the slot 33, and, due to the uniformity of size of the envelopes, the electrode 36 will be positioned in an identical location in each envelope produced.

During the oscillatory movement of the mandrel to effect the seals between the rods 37 and the softened end of the envelope, it is possible that the domed end of the envelope will become deformed. However, its hemispherical shape may be restored by connecting the passage 23 to the discharge of the pump, referred to above, and permitting a slight air pressure to build up within the envelope. This pressure will reshape the envelope end to its former rounded form. After broadening the flame from the burners 39 to anneal the envelope end, and allowing sufficient time for the glass to cool, the envelope containing the mounted element 36 may be removed from the chuck, another element and envelope mounted therein, and the cycle of operations repeated.

I have described mechanism which permits the accurate positioning of elements prior to mounting the same within an envelope; which permits the simultaneous joining of the several mounting means thereof with the envelope; which greatly facilitates the production of articles wherein accurate positioning of elements to be mounted therein is desirable; and which provides for greater uniformity in the finished products.

While I have described my invention as being applied to glass working apparatus, I do not wish to limit myself to such a disclosure, as other uses for my invention, such as, for example, the joining, by soldering, or welding of metallic articles, will be apparent to those skilled in the art.

I claim:

In glass working apparatus, a rotatable chuck comprising a plurality of relatively movable members adapted to frictionally engage and encircle a cylindrical glass blank having a single open end, means for securing said members against relative movement, means within said chuck for hermetically sealing the sides of said open end to said chuck, a mandrel axially mounted in said chuck for rotation therewith and adapted to support and position an element to be sealed to the closed end of said blank, said chuck being apertured to admit air under pressure to the interior of said blank through said open end, said mandrel being movable from without to facilitate the element seal without substantial loss of air pressure.

WILLIAM W. EITEL.